United States Patent

Palovchik

[15] 3,637,140
[45] Jan. 25, 1972

[54] PNEUMATICALLY ACTUATED VARIABLE AREA INLET OR EXHAUST NOZZLE

[72] Inventor: Stephen T. Palovchik, Hartville, Ohio
[73] Assignee: Goodyear Aerospace Corporation, Summit, Ohio
[22] Filed: Sept. 3, 1970
[21] Appl. No.: 69,196

[52] U.S. Cl. .................................................239/265.43
[51] Int. Cl. .................................................B64c 15/06
[58] Field of Search .................239/265.19, 265.33, 265.37, 239/265.41, 265.43; 60/171

[56] References Cited

UNITED STATES PATENTS

| | | | |
|---|---|---|---|
| 2,737,019 | 3/1956 | Billman | 239/265.43 |
| 2,763,426 | 9/1956 | Erwin | 239/265.43 |
| 2,948,111 | 8/1960 | Nelson | 239/265.43 X |
| 2,960,281 | 11/1960 | Jumelle et al. | 239/265.43 X |
| 3,214,903 | 11/1965 | Cochran | 239/265.43 |
| 3,279,192 | 10/1966 | Hull, Jr. et al. | 239/265.43 X |

Primary Examiner—M. Henson Wood, Jr.
Assistant Examiner—Thomas C. Culp, Jr.
Attorney—J. G. Pere and L. A. Germain

[57] ABSTRACT

A nozzle for the inlet or exhaust of a jet engine which reduces the inlet or exhaust area to reduce noise and to change inlet and exhaust flow conditions. The nozzle consists of an open ended cylindrical tube axially aligned with the engine. The inner circumference of the tube is lined with overlapping leaves extending the length of the tube and hinged to rings at the front and rear ends of the tube. A number of inflatable rings or tori are provided between the leaves and the tube midway between its ends. Inflation of the rings forces the centers of the leaves inwardly, reducing the cross-sectional area of the nozzle.

9 Claims, 6 Drawing Figures

PATENTED JAN 25 1972

INVENTOR

STEPHEN T. PALOVCHIK

BY

Oldham & Oldham

ATTORNEYS

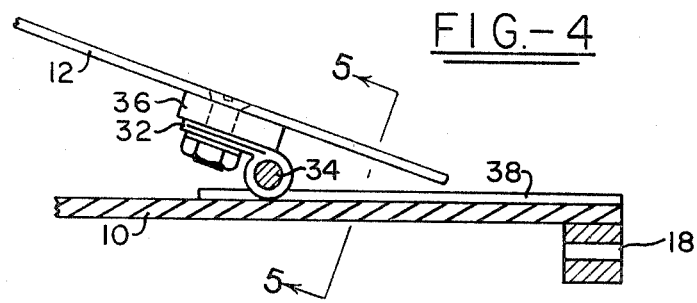
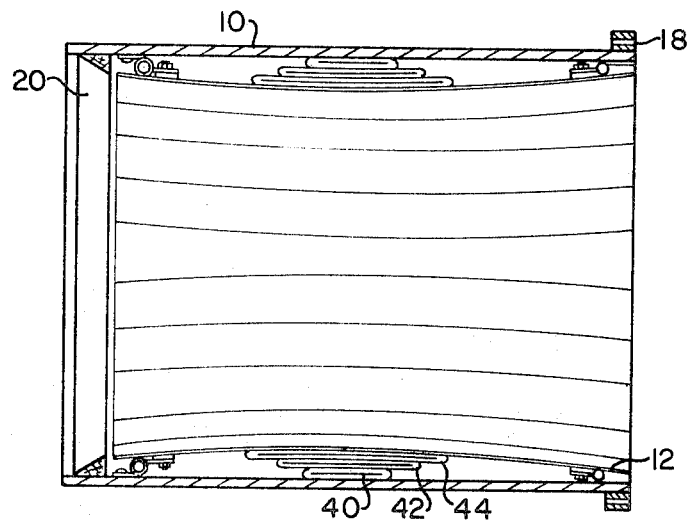
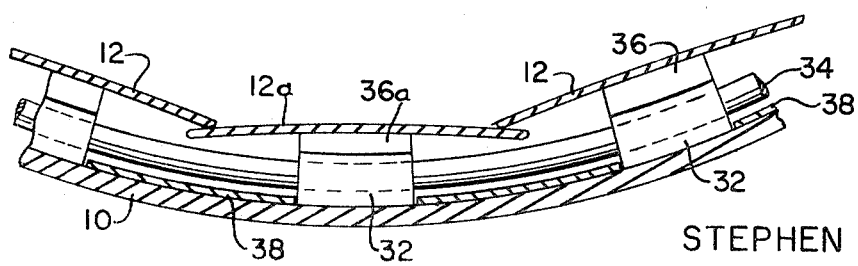

PNEUMATICALLY ACTUATED VARIABLE AREA INLET OR EXHAUST NOZZLE

This invention relates to a nozzle for use on jet aircraft and more particularly to such a nozzle which controllably reduces the cross-sectional area of the nozzle.

Under various circumstances it is desirable to vary a cross-sectional area of the inlet of a jet engine. For example, on subsonic jet aircraft a reduction of the inlet area reduces front radiated noise from the engine. Variable area inlets can also be used on supersonic aircraft to improve engine performance.

Preferably, a variable area inlet or exhaust nozzle should be of lightweight construction so as not to add appreciably to the weight of the aircraft. The variable area nozzle should also be easily controlled and should choke the flow in a manner which produces a minimum of turbulence.

It is the primary object of the present invention to provide a variable area nozzle for use on a jet engine which satisfies the objectives set out above. It is also an object of the invention to provide a variable area nozzle which is highly reliable in operation and which is of simple, low cost construction.

As will become apparent from the following specification, the present invention satisfies these objectives by providing a nozzle in the form of a plurality of overlapped flexible leaves which are fastened to rings at their ends and which are surrounded by inflatable rings at their midpoints. The leaves and inflatable rings are housed in a tubular sleeve. The inflatable rings are preferably formed of thread connected dual wall inflatable fabric. This fabric is manufactured by Goodyear Aerospace Corporation, Akron, Ohio.

The above and other objects and advantages of the invention will become apparent upon consideration of the following specification and the accompanying drawings wherein there is shown a preferred embodiment of the invention.

In the drawing:

FIG. 4 is a fragmentary sectional view, on an enlarged scale showing the arrangement by which the leaves are secured at the exit end of the nozzle;

FIG. 5 is a fragmentary sectional view taken along the line 5—5 of FIG. 4; and

FIG. 6 is a longitudinal sectional view similar to that of FIG. 2, but showing the nozzle in its fully contracted or maximum cross-sectional area condition.

Figure 1:
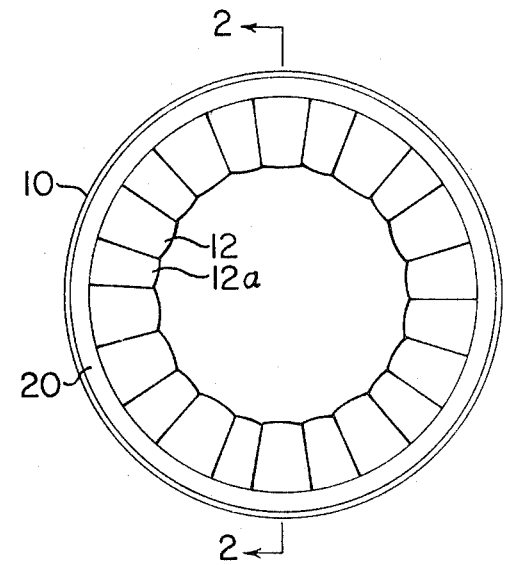
FIG. 1 is an end elevational view of the variable area nozzle of the present invention showing the nozzle in its fully extended or minimum area condition.
Figure 2:
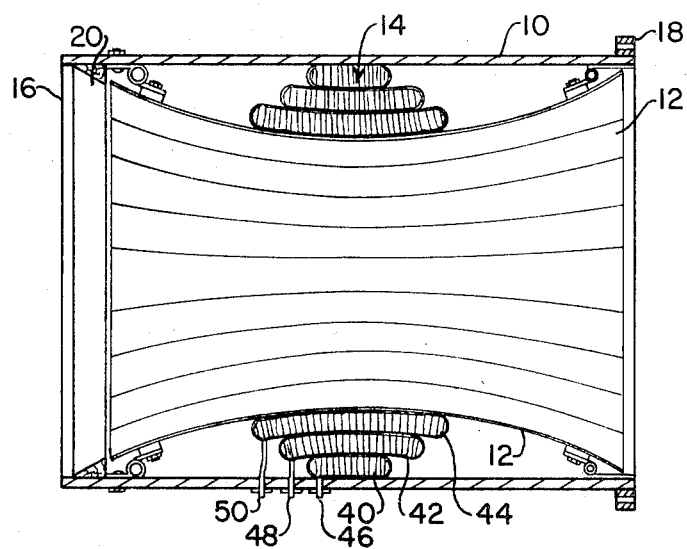
FIG. 2 is a longitudinal section view taken along the line 2—2 of FIG. 1.
Figure 3:
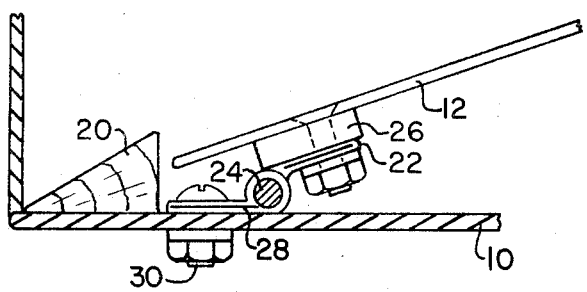
FIG. 3 is an enlarged fragmentary sectional view showing the arrangement by which leaves are secured at the inlet end of the nozzle.

As will be seen from FIGS. 1 and 2, the nozzle consists essentially of an outer tubular shell 10, a plurality of flexible leaves 12 extending lengthwise along the inner surface of the shell 10 in overlapped relationship, and a number of inflatable rings 14 positioned between the shell 10 and the leaves 12. The nozzle illustrated in FIGS. 1 and 2 is an inlet nozzle with an inlet end 16 and a mounting ring 18 at the exit end of the nozzle for securing the nozzle to the forward end of the engine housing. A flow ring 20 is secured to the inner wall of the tube 10 at the entry end 16. In a typical nozzle, the tube 10 is 36 inches long and has an interior diameter of 21.25 inches. Twenty-four aluminum alloy leaves 12 are mounted with the tube 10 and three inflatable rings 14, each of 1 inch thickness when inflated, are provided between the tube 10 and the leaves 12. When the rings 14 are collapsed, the nozzle has an inlet opening of 20 inch diameter. Complete inflation of the rings 14 bends the leaves 12 inwardly to form a smooth venturilike throat reducing the opening to 14.5 inches.

The forward ends of the leaves 12 are bolted to hinges 22 which pivot about a ring 24. Spacer blocks 26 are provided between the leaves 12 and the hinge pieces 22 to hold the leaves in overlapping relationship. The ring 24 extends circumferentially around the inner face of the tube 10. Brackets 28 at spaced intervals along the ring 24 secure the ring 24 to the sleeve 10 by means of bolts 30. The rear ends of the leaves 12 are bolted to hinges 32 hinged to a rod 34 which extends circumferentially around the inner face of the tube 10 adjacent the exit end thereof. Spacers 36 are provided between the leaves 12 and the hinges 32. Alternate ones of the spacers 36 are of greater thickness than adjacent spacers 36a so that the leaves 12 are held in overlapping relation, with alternate ones of the leaves 12 overlying the adjacent leaves 12a. The ring 34 is not fastened to the tube 10. Guide plates 38 are provided between each adjacent hinge 36, and 36a to prevent the ring 34 and leaves 12 and 12a from rotating within the tube. It will be seen that with this arrangement, the forward ends of the leaves 12, 12a are held to a fixed diameter and location by the ring 24 while rear ends of the leaves 12 and 12a are held to a fixed diameter by the ring 34, but are capable of moving longitudinally within the sleeve 10. This, of course, allows the bending of the leaves 12 and 12a to achieve the reduced diameter configuration defined hereinbelow.

Midway between the ends of the leaves 12 are provided three inflatable rings 40–44 extending circumferentially within the tube or sleeve 10. Each of these rings is in the form of a donut or torus and is preferably made of dual wall inflatable fabric. This material, available under the name "Airmat," a registered trademark of the Goodyear Aerospace Corporation, Akron, Ohio consists of a dual wall fabric joined by drop yarns. By selectively pulling the drop yarns, the fabric may be made to take on any desired shape when inflated. The rings 40–42 are formed so as to inflate into tori of the cross-sectional configurations shown in FIG. 2. In some cases the rings may be of uniform thickness along their length, but in other instances will taper as shown in FIG. 2 to smooth restriction formed by bending the leaves. The rings 40–44 are bonded to the tube 10 and to one another by suitable adhesives. Valves 46–50 are provided for inflating the rings 42–44, respectively.

As will be seen in FIG. 6 when the rings 40–44 are collapsed the leaves 12 are substantially straight, providing the maximum cross-sectional flow through the nozzle. Inflation of the rings 40–42, as shown in FIG. 2 causes the midportions of the leaves 12 to bend inwardly, the circular rings 24 and 34 serving to hold the ends of the leaves 12 close to the interior wall of the sleeve 10. The leaves 12 thus form a smoothly curved constriction or throat at the middle of the sleeve 10, reducing the cross-sectional flow through the sleeve. The amount of construction of flow may be varied between the fully deflated, minimum constriction of FIG. 6 and the fully inflated, maximum construction of FIG. 2 by varying the amount of inflation of each of the rings 40–44.

While only one embodiment of the invention has been described, it will be understood that changes and additions may be made thereto. Obviously, the number of leaves and the number and inflated shape of the dual wall fabric rings may be varied in accordance with the size of the nozzle and the range of cross-sectional flow desired. Reference should therefore be had to the appended claims in determining the true scope of the invention.

What is claimed is:

1. A device for use as a variable area nozzle comprising:
    an open-ended cylindrical tube,
    a plurality of flexible leaves extending axially within said tube in overlapping relation to one another;
    means to hold the ends of said leaves adjacent one end of said tube in fixed radial and axial position;
    means to hold the other ends of said leaves adjacent the other end of said tube in a fixed radial position while permitting uniform axial movement; and
    means for adjustably forcing the midportions of said leaves radially inwardly to reduce the cross-sectional area of flow through said nozzle.

2. The device according to claim 1 wherein said last-mentioned means comprises at least one inflatable ring circumferentially surrounding said leaves and controllable inflating means for inflating and deflating said rings.

3. The device according to claim 2 wherein said inflatable ring is formed of a dual wall inflatable fabric.

4. The device according to claim 3 wherein there are provided three concentric inflatable rings.

5. The device according to claim 1 wherein first ends of said leaves are hinged to a circular ring, said ring being of slightly lesser diameter than the inner diameter of said tube and being rigidly connected to said tube adjacent the inlet end thereof.

6. The device according to claim 5 wherein the second ends of said leaves are hinged to a second circular ring, said second ring being of slightly lesser diameter than the inner diameter of said tube and slidable within said tube at the exit end thereof.

7. A variable area nozzle comprising:
 a tubular housing adaptable for mounting at one end;
 first and second circular securing rings of slightly lesser diameter than the inner diameter of said housing;
 a plurality of flexible leaves each hinged at its opposite ends to said first and second rings, said leaves being secured to said rings at uniformly spaced intervals, alternate ones of said leaves overlying adjacent leaves; and
 at least one inflatable ring circumferentially surrounding said leaves, said leaves, securing rings, and inflatable rings being mounted within said housing.

8. The nozzle according to claim 7 wherein the securing ring at the entry end of said housing is rigidly attached thereto and the other securing ring is slidable axially within the housing.

9. The nozzle according to claim 7 wherein said inflatable rings are formed of dual wall inflatable fabric having an inflated configuration complementary to the smooth curvature of said leaves from the secured ends thereof the midportions thereof.

* * * * *